United States Patent Office 3,770,852
Patented Nov. 6, 1973

3,770,852
POLYOLEFIN RESIN BLENDS
Jerome E. Hager, Decatur, and John I. Eisenhauer, Tuscola, Ill., assignors to National Distillers and Chemical Corporation, New York, N.Y.
No Drawing. Filed Apr. 12, 1966, Ser. No. 541,978
Int. Cl. C08f 37/18
U.S. Cl. 260—897 B   4 Claims

ABSTRACT OF THE DISCLOSURE

Polyolefins having broad polymodal molecular weight distribution and improved environmental stress crack resistance are prepared by catalytically polymerizing an olefin, e.g. ethylene or a mixture of ethylene and vinyl acetate in a first reaction region, passing the resulting reaction product to a second reaction region into which a second olefin gas stream is fed and polymerized and blending the polymerization product from said second reaction region with a ethylene-vinyl acetate copolymer.

---

Polyolefin resins, preferably branched chain polyethylene resins, having broad polymodal molecular weight distributions have been prepared by a process described in copending application Ser. No. 430,114 (filed Feb. 3, 1965), now abandoned. According to the disclosed process, a first stream of the olefin, e.g., ethylene gas, is initially passed at a feed rate of from about 11,700 to 36,000 pounds per hour longitudinally through a first reaction region (base resin reactor) maintained at a temperature between about 300° and 500° F. at a pressure of from about 10,500 to 40,000 pounds per square inch. Polymerization within the first reaction region is catalyzed by adding thereto a catalyst having its primary efficacy at temperatures between about 375° and 475° F. A second olefin gas stream is simultaneously passed at a feed rate of from about 720 to 9,350 pounds per hour longitudinally through a second reaction region (wax reactor) maintained at temperatures of from about 445° to 525° F., the gas stream being maintained under pressures at least 1,000 pounds per square inch less than the pressure of the gas stream fed through the first reaction region, suitably at pressures from about 9,500 to 17,500 pounds per square inch. Polymerization is catalyzed in the second reaction region by the addition thereto of a catalyst which has optimum catalytic activity at temperatures of about 475° to 550° F.

The base resin reactor and wax reactor are each designed with an L/D ratio of at least about 11:1, preferably from about 15:1 to 20:1, to obtain optimum conversion of the ethylene feed gas to the resinous reaction product and to minimize, if not prevent, further polymerization in the exit lines from the respective reactors or in the separator to which the reaction product is finally fed.

The reaction product formed at the end of the first reaction region is removed therefrom and fed into the second reaction region at a point intermediate its length, commingling with the reaction mixture in the second region in the proportion of from about 3.3 to 20 parts by weight of such reaction product per part of the reaction mixture. The composite product mixture thus formed is then removed from the the end of the second reaction region, and the desired polyolefin resin is separated from the unreacted feed components.

The catalyst suitable for use in the first region may be any conventional free-radical chain-initiating polymerization catalyst, e.g., an organic peroxide, perbenzoate, or peracetate, such as for example methyl ethyl ketone peroxide, di-t-butyl peroxide, t-butyl hydroperoxide, t-butyl perbenzoate, t-butyl peracetate, and mixtures thereof. It is suitable added to the reaction mixture in a liquid stream in a conventional inert hydrocarbon vehicle, e.g. a refined kerosene or other inert hydrocarbon. Suitably from about 0.4 to 4.3, and preferably from about 0.4 to 1.1, pounds per hour of the catalyst are added to the reaction mixture.

In the second region the catalyst likewise is free-radical chain-initiating, and examples include di-t-butyl peroxide, methyl ethyl ketone peroxide, p-methane hydroperoxide, t-butyl hydroperoxide, and mixtures thereof. Such polymerization catalyst or catalysts may be added in an amount of from about 0.1 to 3.0, and preferably from about 0.4 to 2.5, pounds per hour.

While the above discussion was principally directed to the homopolymerization of an olefin, the process described may be utilized in connection with the interpolymerization of ethylene or other gaseous olefin or olefins with any suitable ethylenically unsaturated compounds known to copolymerize therewith including, for example, those interpolymerizable compounds identified in the Perrin et al. Patent U.S. 2,200,429 (issued May 14, 1940), and assigned to Imperial Chemical Industries, Ltd.) and in the Hanford patent U.S. 2,396,785 (issued March 19, 1946, and assigned to E. I. du Pont de Nemours & Co.).

The poly The polyolefin resins thus produced comprise substantially homogeneous blends of olefin fractions possessing broad polymodal molecular weight distributions, which distributions are broader than those which may be produced utilizing reaction systems involving polymerization within a single reaction region. The polymodal character of the molecular weight distributions thus attained enhances the processability of such resins, the resinous materials possessing smooth surfaces and exhibiting lesser melt fractures than similar resins possessing continuous molecular weight distributions. In addition, the polyolefin resins have outstanding environmental stress cracking resistance.

Although the environmental stress crack resistance and processability of these dual reactor polymers and copolymers are satisfactory for most applications requiring a high molecular weight resin, a commercial demand is arising for resins capable of retaining their properties, especially environmental stress crack resistance, after they have been processed onto wire or cable sheaths and insulations. To assess the resin post-processing properties, severe test utilizing excessive thermo-mechanical shears have been devised, i.e., stress crack resistance determinations after the resin is mixed for prolonged times in a C. W. Brabender Plasticorder.

Dual reactor homopolymers possess excellent raw material properties and processability; however, they were found to possess borderline properties after they were subjected to Brabender tests. The incorporation of vinyl acetate by synthesis into a dual reactor resin was found to improve the post-processing environmental stress crack resistance to a certain degree without adversely affecting the resin's processing characteristics.

It has now been found that a composition having excellent post-processing environmental stress crack resistance and retaining all other physical properties and processability can be prepared from these high molecular weight dual reactor polyolefin homopolymer and copolymer resins by blending them with a minor amount of single reactor ethylene/vinyl acetate copolymer resin. This post-processing of the dual reactor resins results in a product that is particularly well adapted for use in wire and cable coating, especially for cable sheathings that require a high molecular weight resin having exceptional stress crack resistance and processability.

The dual reactor resin component of the resin composition of this invention in general contains about 4 to 40, and preferably about 10 to 20, percent of wax having a wax melt index within the range of about 1,000 to 100,000 and preferably between about 6,000 and 60,000. Dual reactor copolymers useful in the present process can contain up to about 6 percent of vinyl acetate and generally have a vinyl acetate content of about 0.25 to about 3 percent.

The single reactor ethylene/vinyl acetate copolymers blended with the dual reactor resins can be prepared in any known convenient manner or as specifically described below. An ethylene gas stream containing 0 to about 70 percent of vinyl acetate monomer is passed longitudinally through a reactor maintained at a temperature between about 250° and 510° F. at a pressure of from about 10,500 to 40,000 pounds per square inch. The polymerization reactor is catalyzed by the addition of any conventional free-radical chain-initiating polymerization catalyst, e.g., an organic peroxide, perbenzoate, or peracetate, such as for example methyl ethyl ketone peroxide, di-t-butyl peroxide, t-butyl hydroperoxide, t-butyl perbenzoate, t-butyl peracetate, p-methane hydroperoxide, and mixtures thereof. Such polymerization catalyst or catalysts may be added in an amount of about 0.1 to 3.0, and preferably from about 0.4 to 2.5, pounds per hour.

The polymers thus produced contain from 0 to about 70 percent by weight of vinyl acetate copolymerized with ethylene, and preferably the copolymer contains about 20 to 40 percent of vinyl acetate. The melt index of the copolymer additive can range from about 1 to 5000 and is preferably about 20 to 400 grams per 10 min.

As little as about 10 percent of the single reactor component in the total composition will give an improvement in environmental stress crack resistance and processability properties. Ten percent or more may be used, but there is no particular advantage in using these large amounts. In most cases about 3 to 8 percent is used, and 4 to 6 percent is preferred.

The amount of the single reactor copolymer blended with the dual reactor homopolymer or copolymer may contribute to the total composition from about 0.25 to 5 percent of vinyl acetate and preferably from about 0.5 to 2.5 percent of vinyl acetate based on the total composition.

The amount of the dual reactor homopolymer or copolymer may contribute to the final composition from zero to about 2.5 percent of vinyl acetate incorporation and preferably from about 0.5 to 2.0 percent of vinyl acetate, based on the total composition.

In a typical embodiment the required amounts of dual reactor resin and single reactor copolymer are added to a Farrel-Birmingham Model 11-A intensive mixer operating at a rotor speed of 40 revolutions per minute under a pressure of 50 pounds per square inch. The resins are blended for 8.5 to 12.5 minutes after which time the homogeneous blend of the resins is dropped out of the mixer at a temperature of 350° to 370° F. into an extruder and is pelletized.

The resulting composition possesses environmental stress crack resistance and processability properties superior to those possessed by dual reactor ethylene homopolymers, dual reactor ethylene/vinyl acetate copolymers, and single reactor ethylene homopolymers or copolymers blended with single reactor ethylene/vinyl acetate copolymers.

The products have been found particularly useful for wire and cable applications; however, embodiments of this invention may be useful in film, tube, pipe, and blow and injection molding applications that require superior environmental stress crack resistance and processability.

The general nature of the invention having been set forth, the following examples illustrate some specific embodiments of the invention. It is to be understood, however, that the invention is not limited to the examples, since the invention may be practiced by the use of various modifications and changes within the scope of the invention as described herein.

EXAMPLE I (A) Preparation of dual reaction resin

A first ethylene feed gas was fed at a temperature of 121° F. into the base resin reactor at a rate of 24,700 pounds per hour. Simultaneously t-butyl perbenzoate in an amount of 0.84 pound per hour was added to the reaction mixture within the reactor. The reacting mixture was maintained within the base resin reactor at a temperature of 440° F. and under a pressure of approximately 24,300 pounds per square inch. A product stream containing 3,160 pounds per hour of a polyethylene resin fraction having a melt index of approximately 0.001 and 21,540 pounds per hour of ethylene gas was removed into the mixing zone of the wax reactor.

A second ethylene gas stream was similarly fed to the wax reactor, such stream being maintained at a temperature of 121° F. and being fed to the reactor at a rate of 2,400 pounds per hour. 1.12 pounds per hour of di-t-butyl peroxide was added to the reacting mixture within the wax reactor. The pressure within the wax reactor was maintained at approximately 10,100 pounds per square inch and the reaction mixture so agitated as to maintain a reaction temperature of 525° F. within the reaction zone of the wax reactor and a temperature of 500° F. within the mixing zone of the wax reactor. 407 pounds per hour of a polyethylene fraction having an estimated melt index of 30,000 were thereby formed and admixed with the polyethylene-containing product from the base resin reactor.

The composite product was removed from the wax reactor at a temperature of 504° F. The product contained 23,533 pounds per hour of ethylene gas and 3,567 pounds per hour of a polyethylene blend including 3,160 pounds per hour of the polyethylene fraction produced in the base resin reactor and 407 pounds per hour of the polyethylene fraction produced in the wax reactor. The composite blend thus produced comprised 11.4 percent of wax and had a composite melt index of 0.12.

The reaction product was let-down to a pressure of 3,300 pounds per square inch within the high-pressure separator; 1,000 pounds per hour of ethylene and 3,567 pounds per hour of the composite polyethylene-containing blend were removed and fed to the extrusion hopper where the ethylene was flashed off. The remaining 3,567 pounds per hour of product were then fed to the extruder and pelletized for use.

(B) Preparation of single reactor resin

An ethylene feed gas containing 20 percent of vinyl acetate comonomer was fed at a temperature of 119° F.

into a reactor at a combined rate of 14,456 pounds per hour. Simultaneously t-butyl peracetate in an amount of 0.99 pound per hour was added to the reaction mixture within the reactor. The reaction mixture was maintained at a temperature of 435° F. under a pressure of approximately 17,000 pounds per square inch.

The product stream containing 2700 pounds per hour of an ethylene/vinyl acetate copolymer containing 20 percent of vinyl acetate and 11,756 pounds per hour of ethylene gas containing 20 percent of vinyl acetate monomer were removed from the reactor at a temperature of 435° F.

The reaction product was let down to a pressure of 3,500 pounds per square inch within the high-pressure separator; 1020 pounds per hour of ethylene and 2700 pounds per hour of the ethylene/vinyl acetate copolymer were removed from the high-pressure separator and fed to the extrusion hopper where the ethylene was flashed off. The 2700 pounds per hour of product were fed to an extruder and pelletized.

(C) Blending of single reactor and dual reactor resins 19 parts of dual reactor homopolymer resin (A) and 1 part of single reactor ethylene/vinyl acetate copolymer (B) were blended by addition of the coponents to a Farrel Birmingham 11–A intensive mixer. The mixer was operated at a rotor speed of 40 revolutions per minute under a ram pressure of 50 pounds per square inch. After 8½ minutes the mixture had achieved homogenity and was discharged at a temperature of 350° F. into an extruder where it was extruded and pelletized. The resulting homogeneous blend contained 5 percent of single reactor ethylene/vinyl acetate copolymer (B) and 95 percent of dual reactor homopolymer (A). The vinyl acetate content of the blend was 1 percent by weight based on the total composition.

Properties of the component resins and of the composite product are summarized in Table I below:

TABLE I

Physical Properties Dual Reactor Homopolymer/Vinyl Acetate Copolymer Compositions

| Property | Resin— I (A) | I (B) | Blend I (C) |
|---|---|---|---|
| Density (g./cc., ASTM D1505) | 0.918 | 0.934 | 0.932 |
| Melt index (g./10 min., ASTM D1238) | 0.10 | 200 | 0.23 |
| Tensile at break (p.s.i., ASTM D1248) | 2,130 | | 2,140 |
| Yield (p.s.i., ASTM D1248) | 1,500 | | |
| Elongation (percent, ASTM D1248) | 580 | | 610 |
| Brittleness (F at −76° C., ASTM D746) | 1/10 | | 0/10 |
| Stress crack (F, 168 hours, ASTM D1693) | | | 0 |
| Dielectric constant (at 100 kc./s., ASTM D150) | | | 2.67 |
| Dissipation factor (at 100 kc./s., ASTM D150) | 0.0011 | | |
| Wax melt index (g./10 min., calculated) | 30,000 | | 30,000 |
| Wax (percent, calculated) | 11 | | 11 |
| Vinyl acetate (percent) | 0 | 20 | 1 |

EXAMPLE II (A) Preparation of dual reactor resin

A first ethylene feed gas was fed at a temperature of 120° F. into the base resin reactor at a rate of 23,100 pounds per hour. Simultaneously t-butyl peracetate in an amount of 0.34 pound per hour was added to the reaction mixture within the reactor. The reacting mixture was maintained within the base resin reactor at a temperature of 425° F. and under a pressure of 29,900 pounds per square inch. A product stream containing 2,855 pounds per hour of a polyethylene resin fraction having a melt index of approximately 0.001 and 20,245 pounds per hour of ethylene gas was removed into the mixing zone of the wax reactor.

A second gas stream was similarly fed to the wax reactor, such stream being maintained at a temperature of 121° F. and being fed to the reactor at a rate of 3170 pounds per hour. 2.17 pounds per hour of di-t-butyl peroxide was added to the reacting mixture within the wax reactor. The pressure within the wax reactor was maintained at approximately 9,350 pounds per square inch, and the reaction mixture was so agitated as to maintain a reaction temperature of 527° F. within the reaction zone of the wax reactor and a temperature of 500° F. within the mixing zone of the wax reactor. 521 pounds per hour of a polyethylene fraction having an estimated melt index of 30,000 were thereby formed and admixed within the polyethylene-containing product from the base resin reactor.

The composite product was removed from the wax reactor at a temperature of 504° F. The product contained 22,894 pounds per hour of ethylene gas and 2,855 pounds per hour of polyethylene fraction produced in the base reactor and 521 pounds per hour of the polyethylene fraction produced in the wax reactor. The composite blend thus produced comprised 15.45 percent of wax and had a composite melt index of 0.12.

1.5 percent of vinyl acetate monomer was also added to the fresh feed during the reaction; thus all product and gas streams contained 1.5 percent of vinyl acetate.

The reaction product was let-down to a pressure of 3,500 pounds per square inch within the high pressure separator; 1,000 pounds per hour of ethylene and 3,376 pounds per hour of the composite ethylene/vinyl acetate copolymer, containing 1.5 percent of vinyl acetate, were removed and fed to the extrusion hopper where the ethylene was flashed off. The remaining 3,376 pounds per hour of product were then fed to the extruder and pelletized for use.

(B) Preparation of single reactor resin

An ethylene feed gas containing 35 percent of vinyl acetate comonomer was fed at a temperature of 120° F. into a reactor at a combined rate of 10,520 pounds per hour. Simultaneously diisopropyl peroxydicarbonate in an amount of 2.4 pounds per hour was added to the reaction mixture within the reactor. The reaction mixture was maintained at a temperature of 390° F. under a pressure of 20,600 pounds per square inch. The product stream containing 1800 pounds per hour of an ethylene/vinyl acetate copolymer containing 35 percent of vinyl acetate and 8,720 pounds per hour of ethylene gas containing 35 percent of vinyl acetate monomer were removed from the reactor at 390° F.

The reaction product was let down to a pressure of 3,200 pounds per square inch within the high pressure separator; 600 pounds per hour of ethylene and 1800 pounds per hour of the ethylene/vinyl acetate copolymer were removed from the high pressure separator and fed to the extrusion hopper where the ethylene was flashed off. The 1800 pounds per hour of product were fed to an extruder and pelletized.

(C) Blending of single reactor and dual reactor resins 44.5 parts of dual reactor resin (A) and 1 part of single reactor copolymer (B) were blended by the process of Example I (C). Properties of the component resins and of the composite are given in Table II.

For comparative purposes the following compositions were prepared: (III) a single reactor ethylene homopolymer resin, (IV) a single reactor ethylene homopolymer resin blended with a single reactor ethylene/vinyl acetate copolymer resin, (V) a dual reactor ethylene homopolymer resin, and (VI) a dual reactor ethylene/vinyl acetate copolymer. The properties of these composite resins along with the properties of the composite resins prepared in Examples I and II are tabulated in Tables III and IV and serve to show the improvements obtainable by this invention. In addition data are presented in Tables V and VI to show the scope of the invention.

It is apparent from the foregoing description that many modifications of this invention can be made without departing from the scope thereof, with only such limitations placed thereon as are imposed by the appended claims.

TABLE II
Physical Properties Dual Reactor Copolymer/Vinyl Acetate Copolymer Compositions

| Property | Resin— II (A) | II (B) | Blend II (C) |
|---|---|---|---|
| Density (g./cc.. ASTM D1505) | 0.920 | 0.9290 | 0.934 |
| Melt index (g./10 min.. ASTM D1238) | 0.12 | 250 | 0.19 |
| Tensile at break (p.s.i.. ASTM D1248) | 2,180 | | 2,030 |
| Yield (p.s.i.. ASTM D1248) | 1,420 | | 1,400 |
| Elongation (percent. ASTM D1248) | 690 | | 660 |
| Brittleness (F at −76° C.. ASTM D746) | | | 5/100 |
| Stress crack (F. 168 hrs.. ASTM D1693) | | | 0 |
| Dielectric constant (at 100 kc./s.. D150) | | | 2.67 |
| Dissipation factor (at 100 kc./s.. D150) | | | 0.0037 |
| Wax melt index (g./10 min., calculated) | 60,000 | 0 | 60,000 |
| Wax (percent calculated) | 15 | 0 | 15 |
| Vinyl acetate (percent) | 1.5 | 35 | 2.2 |

TABLE IIIa
Typical Physical Properties of Cable Sheathing Resins

| Property/composition | Single reactor ethylene homopolymer III | Single reactor EVA copolymer blend IV | Dual reactor ethylene homopolymer V |
|---|---|---|---|
| Dual reactor: | | | |
| Wax (percent) | | | 18 |
| Wax melt index (g./10 min.) | | | 6,000 |
| Vinyl acetate (percent) | | | 0 |
| Vinyl acetate copolymer: | | | |
| Melt index (g./10 min.) | | | |
| Vinyl acetate (percent) | | | |
| Blend vinyl acetate (percent) | 0 | 1 | 0 |
| Melt index (g./10 min.) | 0.29 | | 0.23 |
| Density (g./cc.) | 0.930 | | 0.930 |
| Plastic recovery (percent) | 29.3 | | 26 |
| Tensile at break (p.s.i.) | 2,260 | | 1,980 |
| Yield (p.s.i.) | 1,510 | | 1,440 |
| Elongation (percent) | 560 | | 590 |
| Brittleness (F at −76° C.) | 0/10 | | 10/100 |
| Stress crack (F at 24 hrs.) | 0 | | 0 |
| Dielectric constant at— | | | |
| 100 kc./s | 2.54 | | 2.58 |
| 1 mc./s | 2.52 | | 2.58 |
| Dissipation factor at— | | | |
| 100 kc./s | 0.00017 | | 0.0012 |
| 1 mc./s | 0.0032 | | 0.0018 |
| Carbon black (percent) | 2.60 | | 2.65 |
| Moisture (percent) | 0.016 | | 0.017 |

TABLE IIIb
Typical Physical Properties of Cable Sheathing Resins

| Property/composition | Dual reactor EVA copolymer VI | Dual reactor/EVA copolymer blend I | Dual reactor copolymer/EVA copolymer blend I |
|---|---|---|---|
| Dual reactor: | | | |
| Wax (percent) | 15 | 11 | 15 |
| Wax melt index (g./10 min.) | 60,000 | 30,000 | 60,000 |
| Vinyl acetate (percent) | 1 | 0 | 1.5 |
| Vinyl acetate copolymer: | | | |
| Melt index (g./10 min.) | | 200 | 250 |
| Vinyl acetate (percent) | | 20 | 35 |
| Blend vinyl acetate (percent) | 1 | 1 | 2.2 |
| Melt index (g./10 min.) | 0.20 | 0.23 | 0.19 |
| Density (g./cc.) | 0.931 | 0.932 | 0.934 |
| Plastic recovery (percent) | 32 | 31 | 27 |
| Tensile at break (p.s.i.) | 2,100 | 2,140 | 2,030 |
| Yield (p.s.i.) | 1,450 | | 1,400 |
| Elongation (percent) | 620 | 610 | 660 |
| Brittleness (F at −76° C.) | 1/10 | 0/10 | 5/100 |
| Stress crack (F at 24 hrs.) | 0 | 0 | 0 |
| Dielectric constant at— | | | |
| 100 kc./s | 2.62 | 2.67 | 2.67 |
| 1 mc./s | 2.60 | 2.65 | 6.64 |
| Dissipation factor at— | | | |
| 100 kc./s | 0.0026 | 0.0041 | 0.0037 |
| 1 mc./s | 0.0034 | 0.0058 | 0.0058 |
| Carbon black (percent) | 2.65 | 2.61 | 2.85 |
| Moisture (percent) | 0.002 | 0.016 | 0.027 |

TABLE IVa
Typical Processability and Post-Processing Physical Properties of Cable Sheathing Resins

| Test/property | Resin III | Blend IV | Resin V |
|---|---|---|---|
| Strand Test:[1] | | | |
| Melt temperature setting (° F.) | 400 | | 400. |
| Melt temperature recorded (° F.) | 410 | | 398. |
| Pressure: | | | |
| Head (p.s.i.) | 4,400 | | 3,700. |
| Die (p.s.i.) | 3,400 | | 2,900. |
| Output (lbs./hr.) | | | 93.5. |
| Power (HP.) | | | 12.1. |
| Power consumption (lbs./HP. hr.) | | | 7.72. |
| Appearance [2] | 6 | | 2–3. |
| Strip test:[3] | | | |
| Melt index change (g./10 min.) | +0.04 | | +0.08. |
| Tensile [4] (p.s.i.) | 2,180 | | 1,850. |
| Elongation [4] (percent) | 570 | | 550. |
| Stress crack:[5] | | | |
| Aged 5 hrs./70° C. (F, 168 hrs.) | F/50, 1 hr. | | F/50, 1 hr. |
| Aged 20 hrs./70° C. (F, 168 hrs.) | F/50, 0.75 hrs. | | F/50, 1 hr. |
| Aged 5 days/70° C. (F, 168 hrs.) | | | |
| Brabender test, F, 7 days: | | | |
| [6] | F/50, 0.25 hrs. | | F/50, 3.6 hrs. |
| [7] | | | |

[1] Test described in J. E. Hager's "Evaluating the Processing Characteristics of Wire and Cable Coating Polyethylene Resins" SPE Journal, January 1956.
[2] Appearance rated against set of standards coded 1=excellent; 6=heavy melt fracture.
[3] A test to assess resin's post-processing properties. A polyethylene strip about 2″ wide by 0.080″ thick is extruded from a commercial extruder and test specimens are taken directly from the strip without erasing their extrusion thermal history.
[4] Test specimen taken in machine direction, tested without annealing at 20″/min. crosshead speed.
[5] Test specimen taken in transverse direction, tested after annealing as indicated.
[6] Sixty minutes in a C. W. Brabender Instruments Inc. Plastic-Corder operated at 125 r.p.m. and 160° C.
[7] Ninety minutes in a C. W. Brabender Instruments Inc. Plasti-Corder operated at 185 r.p.m. and 190° C.

TABLE IVb
Typical Processability and Post-Processing Physical Properties of Cable Sheathing Resins

| Test/property | Resin VI | Blend I | Blend II |
|---|---|---|---|
| Strand test:[1] | | | |
| Melt temperature setting (° F.) | 400 | 400 | 400. |
| Melt temperature recorded (° F.) | 390 | 405 | 400. |
| Pressure: | | | |
| Head (p.s.i.) | 3,800 | 3,500 | 3,350. |
| Die (p.s.i.) | 3,000 | 3,000 | 2,800. |
| Output (lbs./hr.) | 92.0 | 83.8 | 87.2. |
| Power (HP.) | 13.4 | 13.4 | 12.7. |
| Power consumption (lbs./HP. hr.) | 6.9 | 6.25 | 6.87. |
| Appearance[2] | 2 | 2 | 2. |
| Strip test:[3] | | | |
| Melt index change (g./10 min.) | +0.06 | +0.04 | +0.03. |
| Tensile[4] (p.s.i.) | 2,030 | 2,010 | 2,120. |
| Elongation[4] (percent) | 580 | 570 | 670. |
| Stress crack:[5] | | | |
| Aged 5 hrs./70° C. (F, 168 hrs.) | 0 | 0 | 0- |
| Aged 20 hrs./70° C. (F, 168 hrs.) | 0-5/10, 7 days | 0 | 0. |
| Aged 5 days/70° C. (F, 168 hrs.) | do | 0 | 0. |
| Brabender test, F. 7 days: | | | |
| [6] | F/50, 3 hrs.—2/10, 24 hrs. | 1-2/10, 24 hrs. | 0/10, 7 days. |
| [7] | F./50, 2 hrs. | F./50, 1.1 | 3/10, 24 hrs. |

See footnotes (1)(2)(3)(4)(5)(6)(7) bottom of Table IVa.

TABLE Va
Typical Effects of Ingredients on the Physical Properties of Dual Reactor/EVA Copolymer Blends

| Property/composition | Dual reactor homopolymer V | |
|---|---|---|
| Dual reactor: | | |
| Resin wax (percent) | 11 | 11 |
| Wax melt index (g./10 min.) | 6,000 | 30,000 |
| Vinyl acetate (percent) | 0 | 0 |
| Vinyl acetate copolymer: | | |
| Melt index (g./10 min.) | — | — |
| Vinyl acetate (percent) | — | — |
| Blend vinyl acetate (percent) | 0 | 0 |
| Melt index (g./10 min.) | 0.21 | 0.19 |
| Density (g./cc.) | 0.929 | 0.931 |
| Plastic recovery (percent) | 35.8 | 35.8 |
| Tensile at break (p.s.i.) | 2,320 | 2,260 |
| Yield (p.s.i.) | 1,500 | 1,430 |
| Elongation (percent) | 660 | 660 |
| Brittleness (F at −76° C.) | 0/10 | 0/10 |
| Stress crack (F at 24 hrs.) | 0/10 | 0/10 |
| Dielectric constant at— | | |
| 100 kc./s | 2.652 | 2.567 |
| 1 mc./s | 2.643 | 2.561 |
| Dissipation factor at— | | |
| 100 kc./s | 0.0015 | 0.0011 |
| 1 mc./s | 0.0023 | 0.0017 |
| Carbon black (percent) | 2.55 | 2.54 |

TABLE Vc
Typical effects of Ingredients on the Physical Properties of Dual Reactor/EVA Copolymer Blends

| Property/composition | Dual reactor vinyl acetate copolymer VI | Dual reactor EVA copolymer/single reactor EVA copolymer blend II | |
|---|---|---|---|
| Dual reactor: | | | |
| Resin wax (percent) | 15 | 15 | 15 |
| Wax melt index (g./10 min.) | 60,000 | 60,000 | 60,000 |
| Vinyl acetate (percent) | 1.0 | 1.0 | 1.0 |
| Vinyl acetate copolymer: | | | |
| Melt index (g./10 min.) | | 20 | 35 |
| Vinyl acetate (percent) | | 180 | 250 |
| Blend vinyl acetate (percent) | 1.0 | 2.5 | 2.5 |
| Melt index (g./10 min.) | 0.24 | 0.30 | 0.27 |
| Density (g./cc.) | 0.920 | 0.920 | 0.921 |
| Plastic recovery (percent) | 28.5 | 28.5 | 28.5 |
| Tensile at break (p.s.i.) | 1,890 | 1,760 | 1,870 |
| Yield (p.s.i.) | 1,460 | 1,250 | 1,290 |
| Elongation (percent) | 550 | 590 | 610 |
| Brittleness (F at −76° C.) | 0/10 | 2/10 | 1/10 |
| Stress crack (F at 24 hrs.) | 0/10 | 0/10 | 0/10 |
| Dielectric constant at— | | | |
| 100 kc./s | 2.30 | 2.35 | 2.36 |
| 1 mc./s | 2.29 | 2.34 | 2.34 |
| Dissipation factor at— | | | |
| 100 kc./s | 0.0011 | 0.0022 | 0.0026 |
| 1 mc./s | 0.0018 | 0.0052 | 0.0066 |
| Carbon black (percent) | 0 | 0 | 0 |

TABLE Vb
Typical Effects of Ingredients on The Physical Properties of Dual Reactor/EVA Copolymer Blends

| Property/composition | Dual reactor homopolymer/single reactor EVA copolymer bland | | | | | |
|---|---|---|---|---|---|---|
| Dual reactor: | | | | | | |
| Resin wax (percent) | 11 | 11 | 11 | 11 | 11 | 11 |
| Wax melt index (g./10 min.) | 6,000 | 30,000 | 30,000 | 30,000 | 30,000 | 30,000 |
| Vinyl acetate (percent) | 0 | 0 | 0 | 0 | 0 | 0 |
| Vinyl acetate copolymer: | | | | | | |
| Melt index (g./10 min.) | 2 | 2 | 20 | 20 | 35 | 35 |
| Vinyl acetate (percent) | 18 | 18 | 180 | 180 | 250 | 250 |
| Blend vinyl acetate (percent) | 1 | 1 | 1 | 2.5 | 1 | 2.5 |
| Melt index (g./10 min.) | 0.24 | 0.20 | 0.17 | 0.22 | 0.17 | 0.18 |
| Density (g./cc.) | 0.931 | 0.932 | 0.918 | 0.920 | 0.919 | 0.921 |
| Plastic recovery (percent) | 32.1 | 34.5 | 33.3 | 35.8 | 33.3 | 34.5 |
| Tensile at break (p.s.i.) | 2,270 | 2,160 | 1,900 | 1,940 | 2,140 | 1,970 |
| Yield (p.s.i.) | 1,450 | 1,400 | 1,440 | 1,270 | 1,470 | 1,410 |
| Elongation (percent) | 660 | 630 | 520 | 620 | 570 | 560 |
| Brittleness (F. at −76° C.) | 2/10 | 4/10 | 0/10 | 2/10 | 0/10 | 0/10 |
| Stress crack (F. at 24 hrs.) | 0/10 | 0/10 | 0/10 | 0/10 | 0/10 | 0/10 |
| Dielectric constant at— | | | | | | |
| 100 kc./s | 2.798 | 2.759 | 2.29 | 2.36 | 2.31 | 2.36 |
| 1 Mc./s | 2.766 | 2.728 | 2.30 | 2.35 | 2.30 | 2.34 |
| Dielectric constant at— | | | | | | |
| 100 kc./s | 2.798 | 2.759 | 2.29 | 2.36 | 2.31 | 2.36 |
| 1 mc./s | 2.776 | 2.728 | 2.30 | 2.35 | 2.30 | 2.34 |
| Dissipation factor at— | | | | | | |
| 100 kc./s | 0.0050 | 0.0047 | 0.0012 | 0.0024 | 0.0013 | 0.0024 |
| 1 mc./s | 0.0080 | 0.0072 | 0.0024 | 0.0052 | 0.0030 | 0.0088 |
| Carbon black (percent) | 2.58 | 2.74 | 0 | 0 | 0 | 0 |

TABLE VIa

Typical Effects of Ingredients on the Processability and Post-extrusion Physical Properties of Dual Reactor/EVA Copolymer Blends

| Test/property | Homopolymer V | |
|---|---|---|
| Strand test: [1] | | |
|   Melt temperature setting (° F.) | 400 | 400. |
|   Melt temperature recorded (° F.) | 405 | 405. |
|   Pressure: | | |
|     Head (p.s.i.) | 4,100 | 4,000. |
|     Die (p.s.i.) | 3,150 | 3,100. |
|   Output (lbs./hr.) | 91.4 | 94.7. |
|   Power (HP.) | 13.7 | 13.7. |
|   Power consumption (lbs./hr. hrs.) | 6.7 | 6.9. |
|   Appearance [2] | 2 | 1-2. |
| Strip test: [3] | | |
|   Melt index change (g./10 min.) | +0.08 | +0.05. |
|   Tensile [4] | 2,050 | 2,100. |
|   Elongation [4] | 530 | 600. |
|   Stress crack: [5] | | |
|     Aged 5 hrs./70° C. (F/7 days) | F/50, 1 hr. | F/50, 2.75 hr. |
|     Aged 20 hrs./70° C. (F/7 days) | F/50, 0.7 hr. | F/50, 1.75 hrs. |
|     Aged 5 days/70° C. (F/7 days) | | |
| Brabender test, F/7 days: | | |
|   (6) | | |
|   (7) | | |

See footnotes (1)(2)(3)(4)(5)(6)(7) bottom of Table IVa.

TABLE VIb

Typical Effects of Ingredients on the Processability and Post-Extrusion Physical Properties of Dual Reactor/EVA Copolymer Blends

| Test/property | Blend I | | | | | |
|---|---|---|---|---|---|---|
| Strand test: [1] | | | | | | |
|   Melt temperature setting (° F.) | 400 | 400 | 400 | 400 | 400 | 400 |
|   Melt temperature recorded (° F.) | 400 | 400 | 395 | 385 | 400 | 390 |
|   Pressure: | | | | | | |
|     Head (p.s.i.) | 4,100 | 4,000 | 3,900 | 3,700 | 4,000 | 3,700 |
|     Die (p.s.i.) | 3,200 | 3,100 | 3,100 | 2,900 | 3,150 | 3,000 |
|   Output (lbs./hr.) | 93.1 | 94.2 | 92.0 | 92.7 | 91.0 | 88.1 |
|   Power (H.P.) | 13.4 | 13.4 | 13.4 | 12.0 | 13.1 | 12.4 |
|   Power consumption (lbs./hr. hr.) | 6.94 | 7.0 | 6.87 | 7.68 | 6.96 | 7.10 |
|   Appearance [2] | 1-2 | 1-2 | 2 | 1 | 1-2 | 1-2 |
| Strip test: [3] | | | | | | |
|   Melt index change (g./10 min.) | +0.11 | +0.09 | +0.07 | +0.11 | +0.05 | +0.06 |
|   Tensile [4] | 2,080 | 2,050 | 2,020 | 2,030 | 2,100 | 2,090 |
|   Elongation [4] | 560 | 580 | 560 | 570 | 560 | 570 |
|   Stress Crack: [5] | | | | | | |
|     Aged 5 hrs./70° C. (F/7 days) | F/50, 1.75 hrs. | 0 | | | | |
|     Aged 20 hrs./70° C. (F/7 days) | F/50, 2.25 hrs. | F/50 5.6 hrs. | 0 | 0 | 0 | 0 |
|     Aged 5 days/70° C. (F/7 days) | | | 0 | 0 | 1/10 | 0 |
| Brabender test, F/7 days: | | | | | | |
|   (6) | | | 0 | 0 | 1/10 | 0 |
|   (7) | | | F/50, 43 hrs. | 4/10 | F/50, 1.7 hrs. | 4/10 |

See footnotes (1) (2) (3) (4) (5) (6) (7) bottom of Table IVa.

TABLE VIc

Typical Effects of Ingredients on the Processability and Post-extrusion Physical Properties of Dual Reactor/EVA Copolymer Blends

| Test/property | Copolymer VI | Blend II | |
|---|---|---|---|
| Strand test: [1] | | | |
|   Melt temperature setting (° F.) | 400 | 400 | 400 |
|   Melt temperature recorded (° F.) | 390 | 385 | 385 |
|   Pressure: | | | |
|     Head (p.s.i.) | 3,600 | 3,400 | 3,400 |
|     Die (p.s.i.) | 2,900 | 2,700 | 2,700 |
|   Output (lbs./hr.) | 90.2 | 91.3 | 88.4 |
|   Power (H.P.) | 12.73 | 12.06 | 11.73 |
|   Power consumption (lbs./hr. hr.) | 7.09 | 7.57 | 7.54 |
|   Appearance [2] | 1-2 | 1-2 | 2 |
| Strip test: [3] | | | |
|   Melt index change (g./10 min.) | +0.06 | +0.06 | +0.04 |
|   Tensile [4] | 1,960 | 1,900 | 2,030 |
|   Elongation [4] | 600 | 600 | 600 |
|   Stress crack: [5] | | | |
|     Aged 5 hrs./70° C. (F/7 days). | | | |
|     Aged 20 hrs./70° C. (F/7 days). | F/50, 6.5 hrs. | 0 | 0 |
|     Aged 5 days/70° C. (F/7 days). | F/50, 1.7 hrs. | 0 | 0 |
| Brabender test, F/7 days: | | | |
|   (6) | 3/10, 24 hrs. | 1/10, 7 days | 0 |
|   (7) | 10/10, 1.5 hrs. | 0 | 0 |

See footnotes (1) (2) (3) (4) (5) (6) (7) bottom of Table IVa.

What is claimed is:

1. A polymer composition exhibiting improved stress-crack resistance and improved low temperature brittleness comprising as base polymer an ethylene-vinyl acetate copolymer containing from 0.25 to 3 weight percent polymerized vinyl acetate and having a melt index of .12 and from about 1 to 10 weight percent, based on the weight of the base polymer of a low molecular weight ethylene-vinyl acetate copolymer containing from about 20 to 40 weight percent polymerized vinyl acetate and having a melt index of from about 20 to about 400 decigrams per minute.

2. The polymer composition of claim 1 wherein the low molecular weight ethylene-vinyl acetate copolymer is present in an amount of 2.2 percent.

3. The polymer composition of claim 2 wherein the low molecular weight ethylene-vinyl acetate copolymer exhibits a melt index of 250 decigrams per minute.

4. The polymer composition of claim 2 wherein the low molecular weight ethylene-vinyl acetate copolymer exhibits a melt index of 200 to 400 decigrams per minute.

References Cited

UNITED STATES PATENTS

| | | | |
|---|---|---|---|
| 2,947,718 | 8/1960 | Rugg et al. | 260—897 B |
| 2,964,515 | 12/1960 | Rader | 260—94.9 |
| 3,127,370 | 3/1964 | Head | 260—45.5 |
| 3,194,850 | 7/1965 | Sweeney | 260—897 |
| 3,248,359 | 4/1966 | Maloney | 260—897 B |
| 3,183,283 | 5/1965 | Reding | 260—897 |
| 3,219,728 | 11/1965 | Joris et al. | 260—897 |

OTHER REFERENCES

Raff et al.: "Crystalline Olefin Polymers," part II (Interscience) (N.Y.) (1964), pages 263–265.

MURRAY TILLMAN, Primary Examiner

C. J. SECCURO, Assistant Examiner

U.S. Cl. X.R.

260—28.5 AV, 41 R, 87.3, 94.9 R, 94.9 D